United States Patent
Nelson et al.

(10) Patent No.: US 10,353,088 B1
(45) Date of Patent: Jul. 16, 2019

(54) NEUTRON MULTIPLICITY DETECTOR CONTROL CIRCUITRY AND FIRMWARE

(71) Applicants: Triad National Security, LLC, Los Alamos, NM (US); NATIONAL TECHNOLOGY & ENGINEERING SOLUTIONS OF SANDIA, LLC, Albuquerque, NM (US); LAWRENCE LIVERMORE NATIONAL SECURITY, LLC, Livermore, CA (US)

(72) Inventors: Mark Nelson, Los Alamos, NM (US); Eric Sorensen, Los Alamos, NM (US); Brian Rooney, Los Alamos, NM (US); Richard Rothrock, Los Alamos, NM (US); Matthew Newell, Los Alamos, NM (US); Samuel Salazar, Los Alamos, NM (US); Christopher Romero, Los Alamos, NM (US); David Jones, Los Alamos, NM (US); Sean Walston, Livermore, CA (US); Scott Kiff, Albuquerque, NM (US)

(73) Assignees: Triad National Security, LLC, Los Alamos, NM (US); Natl. Tech. & Engineering Solutions of Sandia, LLC, Albuquerque, NM (US); Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/934,163

(22) Filed: Mar. 23, 2018

Related U.S. Application Data

(60) Provisional application No. 62/475,918, filed on Mar. 24, 2017.

(51) Int. Cl.
*G01T 3/08* (2006.01)
*G06F 13/28* (2006.01)

(52) U.S. Cl.
CPC .............. *G01T 3/08* (2013.01); *G06F 13/28* (2013.01)

(58) Field of Classification Search
CPC .............. G01T 3/08; G06F 13/28; G06F 3/06
USPC .......................................................... 710/308
See application file for complete search history.

(56) References Cited

U.S. PATENT DOCUMENTS

| | | | | |
|---|---|---|---|---|
| 2004/0123013 A1* | 6/2004 | Clayton | .............. | G06F 11/1004 710/310 |
| 2013/0043379 A1* | 2/2013 | Holzleitner | ............... | G01T 3/00 250/252.1 |

OTHER PUBLICATIONS

Brian D. Rooney et al., "MC-15: Next Generation Neutron Multiplicity Detector FY12 Annual Report," Publication LA-UR-12-24984, http://permalink.lanl.gov/object/tr?what=info:lanl-repo/lareport/LA-UR-12-24984 (last accessed Mar. 23, 2018).

* cited by examiner

*Primary Examiner* — Edwin C Gunberg
(74) *Attorney, Agent, or Firm* — LeonardPatel PC; Michael Aristo Leonard, II; Sheetal Suresh Patel

(57) ABSTRACT

Neutron multiplicity detector control logic and firmware may control a neutron multiplicity detector such that higher count rates can be achieved by an order of magnitude of more over conventional control logic and firmware. Count rates of over 1,000,000 cps, and even over 1,500,000 cps, have been realized in some implementations.

20 Claims, 2 Drawing Sheets

NEUTRON MULTIPLICITY DETECTOR CONTROL CIRCUITRY AND FIRMWARE

CROSS-REFERENCE TO RELATED APPLICATION

This application claims the benefit of U.S. Nonprovisional Patent Application No. 62/475,918 filed Mar. 24, 2017. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to neutron multiplicity detectors, and more particularly, to neutron multiplicity detector control circuitry and firmware configured to control a neutron multiplicity detector such that it exceeds 500,000 counts-per-second (cps) requirements for accurate detection using a direct memory access (DMA) engine.

BACKGROUND

Neutron multiplicity counting is a technique for characterizing special nuclear materials (SNMs), and can be used as a tool to estimate the mass of the sub-critical SNM configuration, the design, the presence of neutron moderators, and the length of the chain reaction, which is known as the neutron multiplication factor. Neutron multiplicity detectors may be used to assay a neutron source, assist in threat analysis of an unknown container, and assist in the quantitative analysis of multiplication and mass (or activity). Most detectors that are typically used to collect data on sub-critical systems are custom-built and are usually not portable.

However, some portable detectors do exist. A portable neutron multiplicity detector called the "nPod" was created in 2000. This detector contained 15 $^3$He-filled neutron detection tubes embedded in a high-density polyethylene (HDPE) block. These tubes were configured into two rows in the HDPE block. The data from this instrument recorded which tube detected the neutron to within a 1 μs time resolution. This data format, where the detector and time are recorded, is referred to as list-mode data. While the nPod recorded in list-mode, it was not able to process any data, and hence, all analysis of data had to be done offline.

The Ortec Fission Meter™ developed in 2007 contains 30 $^3$He-filled neutron detectors that were placed in front of two hinged HDPE slabs. This detector does not record in list-mode, but rather, creates frequency-binned data (aka Feynman histograms) using an expanding binning method. This detector also requires an external control unit, which is the TDS Ranger 500X™. The time resolution for this detector is also 1 μs.

Also, the previous generation of the MC-15 neutron multiplicity detector (called MC-15 for "Multiplicity Counter-15 tubes"), which was developed in a joint venture between Los Alamos National Laboratory (LANL), Lawrence Livermore National Laboratory (LLNL), and Sandia National Laboratory (SNL), provides portable counting capabilities. However, while prior MC-15 architectures achieved count rates of approximately 50,000 cps, these architectures were incapable of achieving count rate requirements of 500,000 cps or higher, which increased the amount of time required to collect data and obtain statistically significant results. Accordingly, improved neutron multiplicity detector control circuitry may be beneficial.

SUMMARY

Certain embodiments of the present invention may provide solutions to the problems and needs in the art that have not yet been fully identified, appreciated, or solved by conventional neutron multiplicity detector circuitry. For example, some embodiments of the present invention pertain to neutron multiplicity detector control circuitry and firmware configured to control a neutron multiplicity detector such that significantly higher count rates can be achieved.

In an embodiment, an apparatus configured to control at least one neutron multiplicity detector includes at least one processor. The at least one processor includes an ARM processor that includes a direct memory access (DMA) kernel module and a list mode controller (LMC) control user application configured to receive configuration parameters from a user interface (UI). The at least one processor also includes programmable logic including DMA engine firmware and LMC firmware configured to control the at least one neutron multiplicity detector. The LMC control user application is configured to write parameter values into the LMC firmware to control aspects of at least one assay providing list mode data.

In another embodiment, at least one processor includes a DMA kernel module and an LMC control user application configured to receive configuration parameters from a UI. The LMC control user application is configured to write parameter values into LMC firmware to control aspects of at least one assay providing list mode data.

In yet another embodiment, at least one processor includes programmable logic that includes DMA engine firmware and LMC firmware configured to control a first neutron multiplicity detector and a second neutron multiplicity detector. When ready to perform the at least one assay, the LMC firmware is configured to send a Pulse Out signal to the first neutron multiplicity detector and receive Diff In and transistor-transistor logic (TTL) In signals from the first and second neutron multiplicity detectors, respectively.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to neutron multiplicity detector control logic and firmware configured to control a neutron multiplicity detector such that higher count rates can be achieved by an order of magnitude of more over conventional control logic and firmware. In some embodiments, count rates of over 1,000,000 cps, and even over 1,500,000 cps, have been realized. Higher count rates reduce the amount of time needed to collect data and obtain statistically significant results, which facilitates more rapid and effective identification of SNMs, and can be used to estimate the mass of the sub-critical SNM configuration, the design, the presence of neutron moderators, and the length of the chain reaction, which is known as the neutron multiplication factor. Neutron multiplicity detectors may be used to assay a neutron source, assist in threat analysis of an unknown container, and assist in the quantitative analysis of multiplication and mass (or activity). The resolution of some embodiments is constant at 100 nanoseconds (ns), which is an order of magnitude better than the 1 μs resolution of some prior detectors.

Figure 1:
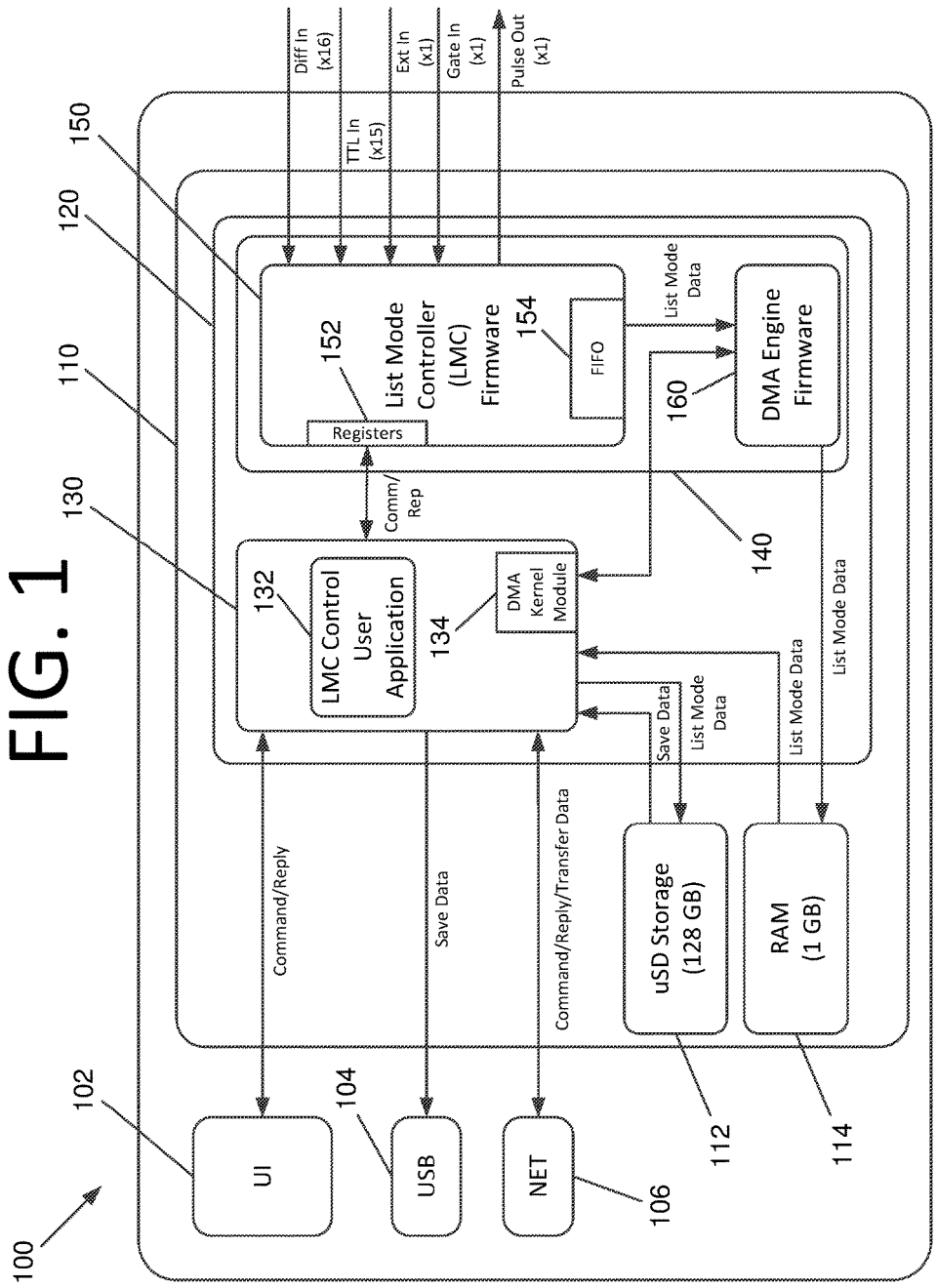
FIG. 1 is an architectural diagram illustrating control circuitry, firmware, and data flow for controlling a neutron multiplicity detector, according to an embodiment of the present invention.

In some embodiments, the novel data flow, architecture, and the way the data is processed provide the speed increase over circuitry controlling the previous generation of the MC-15 from 2012. An architecture for neutron multiplicity detector processing circuitry 100 that realizes such a speed increase is shown in FIG. 1. Processing circuitry 100 includes a user interface (UI) 102 (e.g., written in C#, Java, or any other suitable language without deviating from the scope of the invention), a universal serial bus (USB) interface 104 (e.g., USB 2.0), and a network connection 106 (e.g., Gb Ethernet). UI 102 sends commands to and receives replies from an Arm processor 130 (e.g., an Arm Cortex A-9 PetaLinux™) of a system on a chip (SoC) 120 (e.g., a Xilinx™ Zynq-7000) via RS232 at 115,200 bits per second (bps), for example. Also, during system initialization (e.g., when power is turned on), the software in UI 102 has default configuration parameters that are passed along to list mode controller (LMC) control user application, which then configures itself and LMC firmware 150. USB 104 receives data to save from ARM processor 130. Network connection 106 sends commands, receives replies, and transfers data to/from ARM processor 130.

A system-on-module (SoM) 110 (e.g., an Avnet PicoZed SOM) includes 128 gigabytes (GB) of micro SD (μSD) storage 112 and 1 GB of random access memory (RAM 114) in this embodiment. However, any desired amount of storage may be used without deviating from the scope of the invention. Processor 120 is also mounted on SoC 120. Processor 120 includes Arm processor 130 and programmable logic 140.

Arm processor 130 includes LMC control user application 132 (e.g., written in ANSI C) that writes parameter values into the firmware that controls available aspects of a data collection sequence (i.e., assay). Controllable aspects include, but are not limited to, what channels are active, how long the assay is (e.g., in seconds), whether the veto gate is active, how long the digital deadtime is (e.g., in nanoseconds), how many and what size the DMA memory buffers are and their location in memory, etc. Then LMC control user application 132 issues a "go" command, and the firmware takes over.

Arm processor 130 also includes a DMA kernel module 134 that provides direct memory access to DMA engine firmware 160 (e.g., written in very high speed integrated circuit (VHSIC) hardware description language (VHDL)/Verilog) of programmable logic 140 of processor 120. DMA engine firmware 160 and DMA kernel module 134 enable the movement of list mode data directly from LMC firmware 150 into RAM 114 without interaction with LMC control user application 132. DMA kernel module 134 may then interrupt LMC control user application 132 by notifying it that data is ready to be written to non-volatile storage. Programmable logic 140 also includes LMC firmware 150 (e.g., also written in VHDL) that includes registers 152 and a first-in, first-out (FIFO) queue 154.

LMC firmware 150 communicates with a neutron multiplicity detector (not shown) to cause data to be sent. More specifically, LMC firmware 150 sends a Pulse Out to a neutron multiplicity detector. Responsive thereto, neutron multiplicity detectors provide various signals to processing circuitry 100, including Diff In, Ext In, Gate In, and TTL In. Diff In includes 16 electrical signals emanating from a second neutron multiplicity detector that are recorded along with the 16 that exist in the neutron multiplicity detector that received the Pulse Out signal. Ext In is an external electrical signal input that is available for any external source in some embodiments, and is recorded as the $16^{th}$ signal for the second neutron multiplicity detector (i.e., input from 15 $^3$He tubes+1 external input). Transistor-transistor logic (TTL) In provides electrical signals from the 15 $^3$He tubes of the neutron multiplicity detector that received the Pulse Out signal.

Gate In is an electrical signal input that controls whether data is to be collected. For instance, some samples are "quiet" and do not generate many neutrons on their own. For such samples, a neutron generator (not shown) may be placed near the sample so it can be bombarded with neutrons, which subsequently causes increased neutron emissions from the sample after bombardment. However, while a sample is being bombarded with neutrons, one generally does not want to run the detectors since many of the counted neutrons will not be from the sample itself. Accordingly, a user may enable a "veto gate" using the neutron generator's software. If the user enables the "veto gate" in software (i.e., provides a signal indicating that samples should not be collected), when that electrical signal is asserted, data collection by processing circuitry 100 ceases until the signal is de-asserted.

LMC firmware 150 includes clock logic that runs at 100 MHz in this embodiment and generates the "time tag" for neutron detections that are recorded in the list mode data. However, any suitable clock speed may be used without deviating from the scope of the invention. The clock logic also gracefully ends an assay when the configured duration (e.g., in seconds) has expired. There is logic in the firmware that ensures "valid pulses" are counted that are at least 50 ns elapsed time, thereby disregarding "noise" glitches that may exist in the electrical system. There is logic that allows the user to turn off a channel (e.g., maybe one of the detectors is malfunctioning and the user wants to eliminate it from the data stream). LMC firmware 150 also keeps track of channel counts (i.e., how many neutrons were detected) for each of the 32 data channels. All of the neutron detections also generate an electrical signal on the Pulse Out line. This electrical signal can be fed into another neutron multiplicity detector or other recording device. Once a detection is deemed "valid", it is paired with its detection time and transferred into FIFO 154.

Registers 152 store health and status information, count rates, and Feynman histograms. Health indicates whether data has been lost. Status indicates how much time has elapsed, the current channel counts, etc. LMC firmware 150 is configured to generate sixteen different Feynman histograms in this embodiment. Each histogram may be 1024 entries wide by four bytes per entry, or any other suitable size without deviating from the scope of the invention. The information from registers 152 is then provided each second to Arm processor 130, which is running LMC control user application 132.

The list mode data is what ends up being recorded in permanent storage (e.g., μSD storage 112). Each event in the list mode data is 8 bytes (i.e., 64 bits) in this embodiment. The first 4 bytes (32 bits) represent a location of neutron detection. The second 4 bytes represent the time of the detection. The list mode does not enter registers 152. Registers 152 contain configuration parameters for LMC firmware 150 from LMC control user application 132, along with health and status information.

Per the above, the processed data is moved to FIFO 154 to be provided as part of the list mode data to DMA firmware engine 160. DMA kernel module 134 is the code that configures DMA engine firmware 160. LMC control user application 132 tells DMA kernel module 134 how DMA engine firmware 160 should be configured, and DMA kernel module 134 carries out this task. DMA firmware engine 160 informs DMA kernel module 134 when to interrupt LMC control user application 132.

DMA firmware engine 160 sends the list mode data directly to RAM 114, and then sends an interrupt signal to DMA kernel module 134, which is passed on to LMC control user application 132. From there, LMC control user application 132 can cause Arm processor 130 to send the list mode data to uSD 112. After data collection is complete, list mode data can then be saved to USB 104 or transferred via network connection 106. Health and status information is provided to UI 102 at all times in this embodiment.

Figure 2:
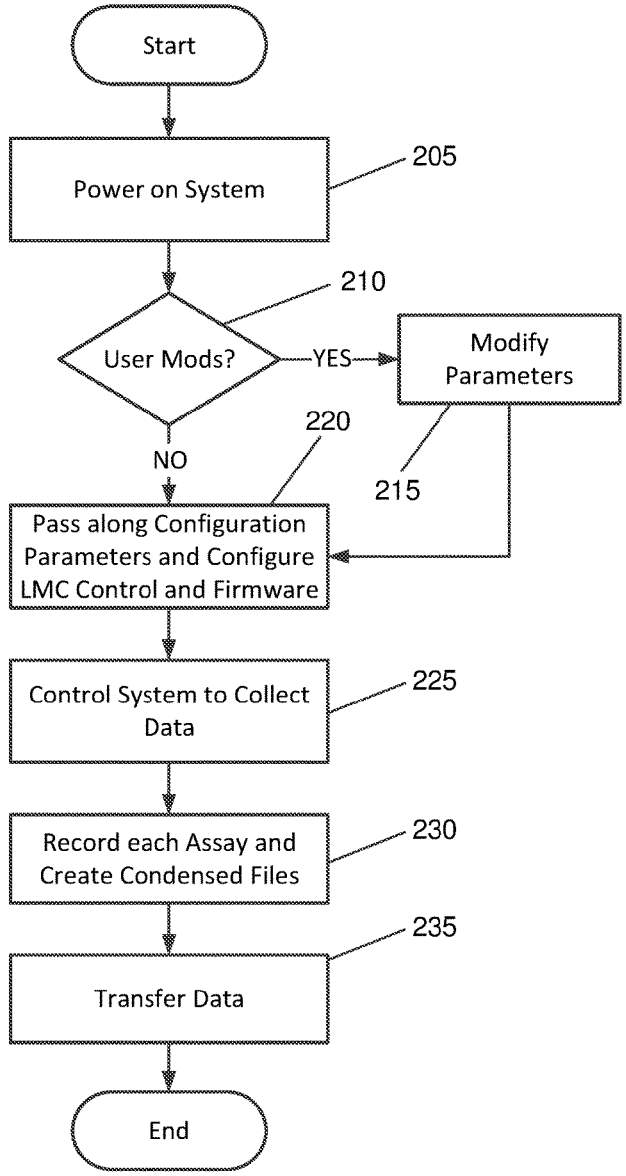
FIG. 2 is a flowchart illustrating a process for controlling and retrieving data using the control circuitry of FIG. 1, according to an embodiment of the present invention.

FIG. 2 is a flowchart illustrating a process for controlling and retrieving data using the control circuitry of FIG. 1, according to an embodiment of the present invention. The process begins with powering on the system at 215. The user has the ability to modify configuration parameters using the UI. If user modifications are desired at 210, the parameters are modified accordingly at 215. The software in the user interface then passes along default configuration parameters and user-specified configuration parameters (if any) for those that the user changed to the LMC control user application, which then configures itself and the LMC firmware at 220.

The user then controls the system to collect data (e.g., to run a particular number of assays of specific duration) via the UI at 225. Each assay is then recorded and condensed files for each assay are created at 230. For instance, each assay may be recorded in a digital file (list mode data) on the μSD card using a date/time stamp as the filename. The condensed file version may contain results that are created in real time in the LMC firmware. It does not contain list mode data since list mode data can be up to 2 GB in size in some embodiments. Each condensed file is 20 KB or less in some embodiments. Once all assays have been run, the user can initiate data transfer at 235. For instance, the user may insert an external μSB storage device and initiate data transfer of any/all data files from the μSD storage to the external device. Additionally, or alternatively, the user may transfer the data to another networked system via a network connection.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus configured to control at least one neutron multiplicity detector, comprising:
at least one processor, comprising:
an ARM processor comprising a direct memory access (DMA) kernel module and a list mode controller (LMC) control user application configured to receive configuration parameters from a user interface (UI); and
programmable logic comprising DMA engine firmware and LMC firmware configured to control the at least one neutron multiplicity detector, wherein
the LMC control user application is configured to write parameter values into the LMC firmware to control aspects of at least one assay providing list mode data.

2. The apparatus of claim 1, wherein controllable aspects of the at least one assay comprise what channels are active, how long each assay is, whether a veto gate is active, how long digital deadtime is, how many and what size DMA memory buffers are and their location in memory, or any combination thereof.

3. The apparatus of claim 1, wherein
the DMA kernel module is configured to provide direct memory access to the DMA engine firmware, and
the DMA engine firmware and the DMA kernel module are configured to enable movement of the list mode data directly from the LMC firmware into volatile storage without interaction with the LMC control user application.

4. The apparatus of claim 3, wherein the DMA kernel module is configured to interrupt the LMC control user application when the list mode data is ready to be written to nonvolatile storage.

5. The apparatus of claim 1, wherein the at least one neutron multiplicity detector comprises a first neutron multiplicity detector and a second neutron multiplicity detector, and when ready to perform the at least one assay, the LMC firmware is configured to:
send a Pulse Out signal to the first neutron multiplicity detector; and
receive Diff In and transistor-transistor logic (TTL) In signals from the first and second neutron multiplicity detectors, respectively.

6. The apparatus of claim 5, wherein
Diff In comprises electrical signals emanating from $^3$He tubes of the second neutron multiplicity detector, and
TTL In provides electrical signals from $^3$He tubes of the first neutron multiplicity detector.

7. The apparatus of claim 5, wherein
the LMC firmware comprises channel count tracking logic that keeps track of how many neutrons were detected for each data channel, and
each neutron detection generates a respective signal on a line that carries the Pulse Out signal.

8. The apparatus of claim 1, wherein upon assertion of a Gate In signal, the LMC firmware is configured to cease data collection until the Gate In signal is de-asserted.

9. The apparatus of claim 1, wherein the LMC firmware comprises:
clock logic that generates a time tag for neutron detections that are recorded in the list mode data and ends each assay when a configured duration has expired;
valid pulse logic that ensures valid pulses are counted that are at least a predetermined number of nanoseconds of nanoseconds of elapsed time, thereby disregarding electrical system noise glitches;
channel control logic that allows a user to turn off a channel; and
channel count tracking logic that keeps track of how many neutrons were detected for each data channel.

10. The apparatus of claim 1, wherein the programmable logic further comprises:
a plurality of registers storing LMC firmware configuration parameters, health and status information, count rates, and Feynman histograms; and
a first-in, first-out (FIFO) queue.

11. The apparatus of claim 10, wherein once a neutron detection is deemed valid, the neutron detection is paired with its detection time and transferred into the FIFO queue and provided as part of the list mode data to the DMA firmware engine.

12. The apparatus of claim 1, wherein
the DMA kernel module configures the DMA engine firmware,
the LMC control user application instructs the DMA kernel module how the DMA engine firmware should be configured, and
the DMA firmware engine informs the DMA kernel module when to interrupt the LMC control user application by sending list mode data to random access memory (RAM), which then sends an interrupt signal to DMA kernel module, which then passes the list mode data to the LMC control user application.

13. The apparatus of claim 1, wherein the LMC control user application is configured to provide health and status information from registers of the LMC firmware to the UI.

14. At least one processor, comprising:
a direct memory access (DMA) kernel module and a list mode controller (LMC) control user application configured to receive configuration parameters from a user interface (UI), wherein
the LMC control user application is configured to write parameter values into LMC firmware to control aspects of at least one assay providing list mode data.

15. The at least one processor of claim 14, wherein
the DMA kernel module configures a DMA engine firmware,
the LMC control user application instructs the DMA kernel module how the DMA engine firmware should be configured, and
the DMA firmware engine informs the DMA kernel module when to interrupt the LMC control user application by sending list mode data to random access memory (RAM), which then sends an interrupt signal to DMA kernel module, which then passes the list mode data to the LMC control user application.

16. The at least one processor of claim 14, wherein controllable aspects of the at least one assay comprise what channels are active, how long each assay is, whether a veto gate is active, how long digital deadtime is, how many and what size DMA memory buffers are and their location in memory, or any combination thereof.

17. At least one processor, comprising:
programmable logic comprising DMA engine firmware and LMC firmware configured to control a first neutron multiplicity detector and a second neutron multiplicity detector, wherein
when ready to perform the at least one assay, the LMC firmware is configured to:
send a Pulse Out signal to the first neutron multiplicity detector; and
receive Diff In and transistor-transistor logic (TTL) In signals from the first and second neutron multiplicity detectors, respectively.

18. The at least one processor of claim 17, wherein
Diff In comprises electrical signals emanating from $^3$He tubes of the second neutron multiplicity detector, and
TTL In provides electrical signals from $^3$He tubes of the first neutron multiplicity detector.

19. The at least one processor of claim 17, wherein the LMC firmware comprises:
clock logic that generates a time tag for neutron detections that are recorded in the list mode data and ends each assay when a configured duration has expired;
valid pulse logic that ensures valid pulses are counted that are at least a predetermined number of nanoseconds of elapsed time, thereby disregarding electrical system noise glitches;

channel control logic that allows a user to turn off a channel; and channel count tracking logic that keeps track of how many neutrons were detected for each data channel.

20. The at least one processor of claim 17, wherein the LMC firmware comprises channel count tracking logic that keeps track of how many neutrons were detected for each data channel, and each neutron detection generates a respective signal on a line that carries the Pulse Out signal.

* * * * *